US011989319B2

(12) United States Patent
Ogle et al.

(10) Patent No.: US 11,989,319 B2
(45) Date of Patent: *May 21, 2024

(54) UTILIZING A MNEMONIC FOR COMMUNICATING SENSITIVE DATA

(71) Applicant: INTERNATIONAL BUSINESS MACHINES CORPORATION, Armonk, NY (US)

(72) Inventors: David M. Ogle, Powell, OH (US); Vincent Tkac, Delaware, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/144,413

(22) Filed: Jan. 8, 2021

(65) Prior Publication Data
US 2021/0133352 A1 May 6, 2021

Related U.S. Application Data

(63) Continuation of application No. 15/400,421, filed on Jan. 6, 2017, now Pat. No. 10,909,263.

(51) Int. Cl.
*G06F 21/62* (2013.01)
*G06F 21/42* (2013.01)
(Continued)

(52) U.S. Cl.
CPC .......... *G06F 21/6245* (2013.01); *G06F 21/42* (2013.01); *G06Q 20/38215* (2013.01);
(Continued)

(58) Field of Classification Search
None
See application file for complete search history.

(56) References Cited

U.S. PATENT DOCUMENTS 5,892,470 A * 4/1999 Kusnick .................. H03M 7/08
341/106
8,386,461 B2 2/2013 Bachmann
(Continued)

OTHER PUBLICATIONS

Dcode.Fr, "Base 36 Cipher", https://www.dcode.fr/base-36-cipher, retrieved on Jun. 16, 2023 (Year: 2023).*
(Continued)

*Primary Examiner* — Steven S Kim
*Assistant Examiner* — Jason B Fenstermacher
(74) *Attorney, Agent, or Firm* — Stephanie Carusillo; Andrew D. Wright; Calderon Safran & Cole, P.C.

(57) ABSTRACT

Systems and methods for utilizing a mnemonic to communicate sensitive data to an agent are disclosed. In aspects, a computer-implemented method comprises: establishing a telephone connection between a caller and an agent; entering an encryption key received from the agent into a mnemonic application of the computer device to permute an algorithm of the mnemonic application; receiving sensitive data in the form of one or more alphabetic, numeric or alpha-numeric sequence; initiating the mnemonic application to generate a mnemonic of the sensitive data using the encryption key, wherein the mnemonic is a sequence of words representing the sensitive data; displaying the mnemonic to the caller; and conveying audio communication of the mnemonic to the agent through the telephone connection to enable remote decoding of the mnemonic back into the at least one sensitive number sequence.

19 Claims, 3 Drawing Sheets

(51) Int. Cl.
　　*G06Q 20/38*　　(2012.01)
　　*H04L 9/06*　　(2006.01)
　　*H04L 9/40*　　(2022.01)

(52) U.S. Cl.
　　CPC ........ *H04L 9/0618* (2013.01); *H04L 63/0428* (2013.01); *H04L 63/061* (2013.01); *H04L 2209/04* (2013.01); *H04L 2209/56* (2013.01); *H04M 2203/609* (2013.01)

(56) References Cited

U.S. PATENT DOCUMENTS

| | | | |
|---|---|---|---|
| 9,092,772 | B2 | 7/2015 | Fernandez et al. |
| 2002/0029195 | A1 | 3/2002 | Russell et al. |
| 2002/0085644 | A1* | 7/2002 | Hayami ............ G11B 20/1426 |
| 2003/0191945 | A1* | 10/2003 | Keech .................. G06Q 20/341 |
| | | | 705/64 |
| 2007/0300076 | A1 | 12/2007 | Diffie et al. |
| 2010/0202611 | A1* | 8/2010 | Watson ............... G06F 21/6245 |
| | | | 380/210 |
| 2012/0008875 | A1 | 1/2012 | Martensson |
| 2016/0019530 | A1* | 1/2016 | Wang ................... G06Q 20/351 |
| | | | 705/39 |
| 2016/0171238 | A1* | 6/2016 | Sibillo ................. H04W 4/029 |
| | | | 713/164 |
| 2017/0026516 | A1* | 1/2017 | Westlake ................ H04M 3/51 |
| 2018/0197169 | A1 | 7/2018 | Ogle et al. |

OTHER PUBLICATIONS

Disclosed Anonymously, "Method to Trigger Credit Card Transactions With The Holder Position", http://ip.com/IPCOM/000224989, IP.com, Jan. 18, 2013, 4 pages.

Disclosed Anonymously, "Sharing of Limited Use Credit Authorization Codes on Mobile Devices", http://ip.com/IPCOM/000244787, IP.com, Jan. 15, 2016, 3 pages.

"Credit Card Number and Password Encoder/Decoder", analyticbridge.com/group/codesnippets/forum/topics/credit-card-number-and-password-encoder-decoder, Accessed Jan. 5, 2017, 3 pages.

Schluter, HC.; "IDENTIKEY—identification for access control"; Office Management, vol. 30, No. 2, Feb. 1982, 7 pages.

List of IBM Patents or Patent Applications Treated as Related, dated Jan. 7, 2021, 1 page.

* cited by examiner

UTILIZING A MNEMONIC FOR COMMUNICATING SENSITIVE DATA

BACKGROUND

The present invention relates generally to securely communicating sensitive information and, more particularly, to utilizing a mnemonic for audio communication of sensitive information, such as credit card numbers.

Presently, the problem of securely transmitting credit card information or other sensitive numeric or alphabetic data over a computer network is being addressed in multiple ways, including the use of various encryption devices and methods. However, such methods are directed to network communications between computer devices, and do not address the real-world problem of communicating sensitive number sequences verbally over a telephone connection. For example, instances may arise when an agent speaking with a user (e.g., caller) needs the user to verbally communicate the user's credit card number, expiration data, and card verification value (CCV) code to the agent. However, it may be undesirable for the user to convey such sensitive information, such as when the user is in public. This is especially true in the case of a poor telephone connection, where the user may need to repeatedly verbally communicate the sensitive information to the agent over the telephone, putting the user's sensitive information at risk of theft.

SUMMARY

In an aspect of the invention, a computer-implemented method for utilizing a mnemonic to communicate sensitive data to an agent includes: establishing, by a computing device, a telephone connection between a caller and an agent; entering, by the computing device, an encryption key received from the agent into a mnemonic application of the computer device to permute an algorithm of the mnemonic application; receiving, by the computing device, sensitive data in the form of one or more alphabetic, numeric or alpha-numeric sequence; initiating, by the computing device, the mnemonic application to generate a mnemonic of the sensitive data using the encryption key, wherein the mnemonic is a sequence of words representing the sensitive data; displaying, by the computing device, the mnemonic to the caller; and conveying, by the computing device, audio communication of the mnemonic to the agent through the telephone connection to enable remote decoding of the mnemonic back into the at least one sensitive number sequence. Advantageously, the method enables secure telephone communication of sensitive data.

In aspects, the method step of entering the sensitive data into the mnemonic application of the computing device includes initiating, by the computing device, a camera to take a digital picture of the sensitive data; and initiating, by the computing device, a character recognition function to determine the sensitive data from the digital picture. Advantageously, this method step enables for quick and secure entry of sensitive data into the computing device.

In another aspect of the invention, there is a computer program product for utilizing a mnemonic to verbally communicate sensitive data. The computer program product comprises a computer readable storage medium having program instructions embodied therewith. The program instructions are executable by a computing device to cause the computing device to: enter an encryption key received from a remote agent into a mnemonic application of the computing device to permute an algorithm of the mnemonic application; enter sensitive data in the form of one or more alphabetic, numeric or alpha-numeric sequence into the mnemonic application of the computing device; initiate the mnemonic application to generate a mnemonic using the encryption key, wherein the mnemonic is a sequence of words representing the sensitive data; display the mnemonic to the caller; and convey audio communication of the mnemonic to the agent through the telephone connection to enable remote decoding of the mnemonic back into the at least one sensitive number sequence. Advantageously, the computer program product enables secure telephone communication of sensitive data.

In aspects the computer program product further includes program instructions executable by a computing device to cause the computing device to: initiate a camera to take a digital picture of the sensitive data; initiate a character recognition function to determine the sensitive data from the digital picture; and store the sensitive data in a database of the computing device. Advantageously, the program instructions enable quick and secure entry of sensitive data into the computing device.

In another aspect of the invention, there is a system for utilizing a mnemonic to verbally communicate sensitive data. The system includes: a CPU, a computer readable memory and a computer readable storage medium associated with a computing device; program instructions to enter an encryption key received from a remote agent into a mnemonic application of the computing device to permute an algorithm of the mnemonic application; program instructions to enter sensitive data into the mnemonic application of the computing device; program instructions to initiate the mnemonic application to generate a mnemonic using the encryption key, wherein the mnemonic is a sequence of words representing the sensitive data; program instructions to display the mnemonic to the caller; and program instructions to convey audio communication of the mnemonic to the agent through the telephone connection to enable remote decoding of the mnemonic back into the at least one sensitive number sequence; wherein the program instructions are stored on the computer readable storage medium for execution by the CPU via the computer readable memory. Advantageously, the system enables secure telephone communication of sensitive data.

In aspects, the system further includes: program instructions to initiate a camera to take a digital picture of the sensitive data; program instructions to initiate a character recognition function to determine the sensitive data from the digital picture; and program instructions to store the sensitive data in a database of the computing device. Advantageously, this system enables quick and secure entry of sensitive data into the computing device.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
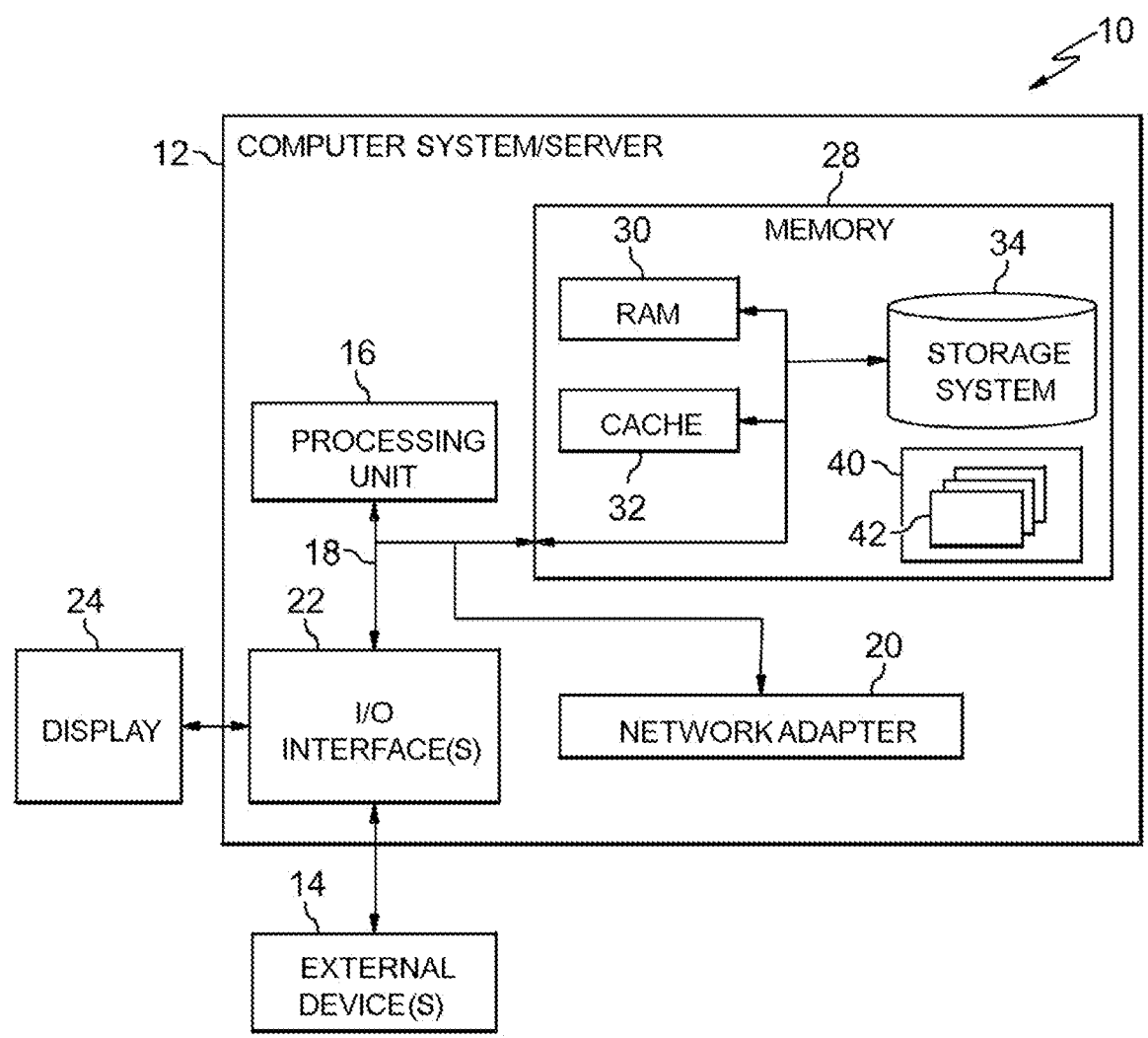
FIG. 1 depicts a computing infrastructure according to an embodiment of the present invention.

The present invention relates generally to securely communicating sensitive information and, more particularly, to utilizing a mnemonic for audio communication of sensitive information, such as credit card numbers. In aspects, the present invention enables a user (e.g., a caller) to more easily and securely communicate a credit card number or other sensitive information verbally to an agent while in a public space. Upon establishing a telephone connection between an agent and a user, the agent and user agree on an encryption key (e.g. a two character key) that will be used to permute an algorithm of the mnemonic application. In aspects, the agent will provide the encryption key to the user (e.g., audio communication of encryption key over the telephone connection), and the user will enter the encryption key into the mnemonic application of their mobile device. With this method, the encryption key is not heard by anyone around the user, preventing anyone around the user from overhearing and interpreting a mnemonic later generated by the mnemonic application.

In embodiments, the invention uses an input device of the user's mobile device (e.g., smartphone) to enable the user to input sensitive data into the mnemonic application. In embodiments, the input device is in the form of a mobile device keyboard or a mobile device camera. By way of example, a mobile device camera may be utilized by the user to capture an image of a credit card number. The credit card number may then be stored in the mobile device for use in future transactions. The mnemonic application would then use an optical character reader (OCR) tool to convert the credit card image into numbers, which the mnemonic application would use to generate a mnemonic representation of the credit card number.

According to aspects of the invention, once the mnemonic application verifies the sensitive data, the algorithm of the mnemonic application is initiated to generate a mnemonic representation of the sensitive data using the encryption key, and the mnemonic is displayed to the user via the mobile device. In embodiments, the user then reads the mnemonic to the agent over the telephone connection and the agent enters the mnemonic into a mnemonic application on an agent-accessed server in order to decode the mnemonic back to the sensitive data, which the agent or a third party can utilize in a transaction (e.g., credit card purchase).

In aspects, a method is provided for sending confidential content, the method comprising: receiving on a mobile device an indication of a type of encryption; applying the type of encryption to a digital content that includes a confidential content; generating a mnemonic based, at least in part, on an encrypted version of the digital content; and sending, to a user of the mobile device, the mnemonic. In aspects, the method further comprises capturing an image of a written form of confidential content and generating the digital content based on a content of the image. In aspects, the receiving step of the invention includes receiving, on the mobile device, a salt for cryptography. In embodiments, the method includes sending, by the mobile device, the mnemonic to a computer device of a user that is permitted to view the confidential content. In embodiments, the method includes determining that a transaction has been initiated by the user.

In embodiments, the present invention provides a technical solution to the technical problem of securely communicating sensitive data telephonically between a caller and an agent, by providing a system that enables confidential communication of sensitive data over a telephone connection, such as in the instances where an exchange of digital data between the caller and the agent is impossible.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
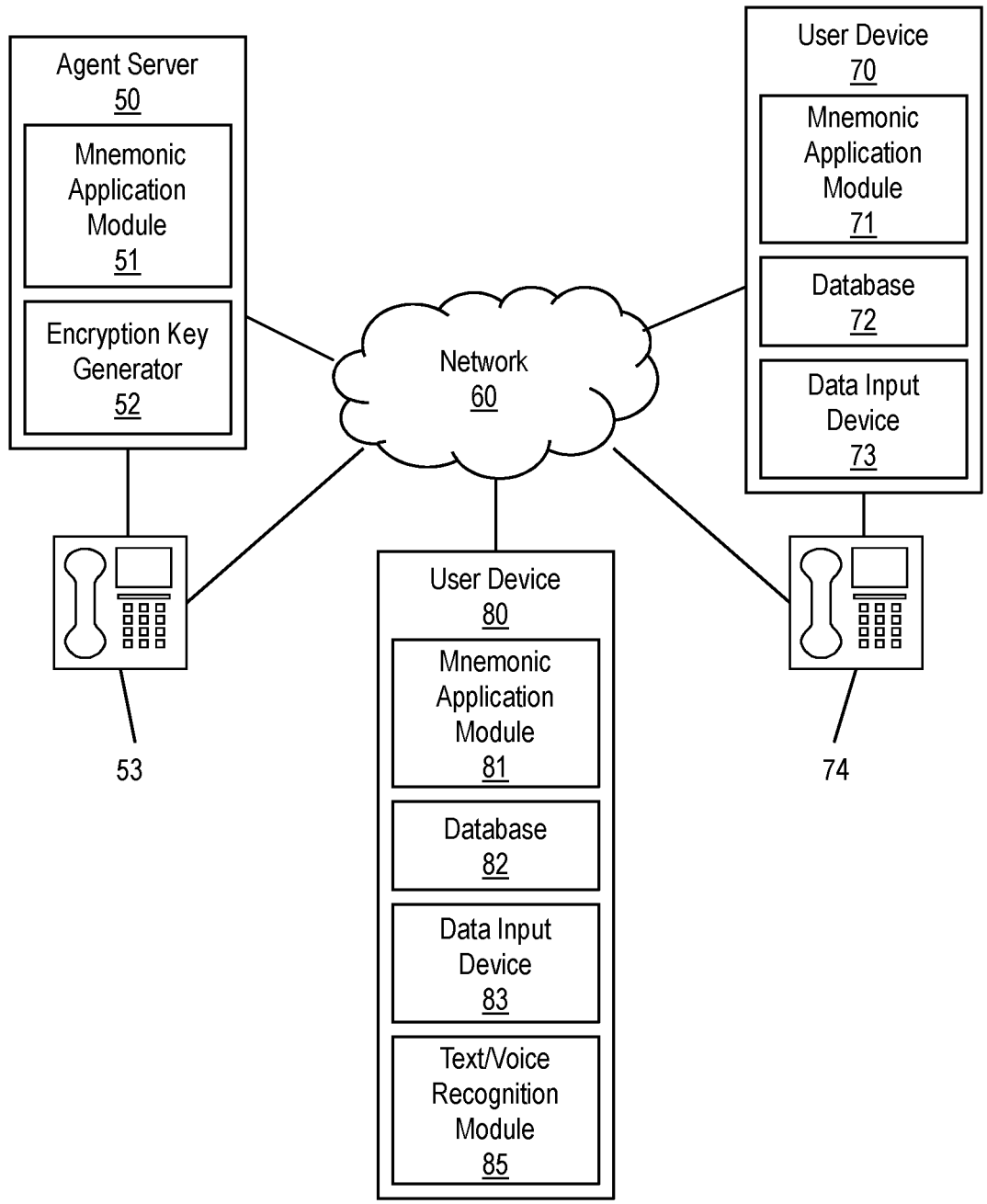
FIG. 2 shows an exemplary environment in accordance with aspects of the invention.

FIG. 2 shows an exemplary environment in accordance with aspects of the invention. The environment includes an agent server 50 (e.g., a web server) connected to a network 60. The agent server 60 may comprise a computer system 12 of FIG. 1, and may be connected to the network 60 via the network adapter 20 of FIG. 1. The agent server 50 may be configured as a special purpose computing device that is part of a payment processing system. For example, the agent server 50 may be configured to process credit card transactions. In embodiments, the agent server 50 includes a mnemonic application module 51 and an encryption key generator 52. In aspects, the agent server 50 is in communication with a telephone indicated at 53, which may be any type of conventional telephone device. The agent server 50 may be directly connected to the telephone 53, or may be connected through the network 60.

The network 60 may be any suitable communication network or combination of networks, such as a landline telephone network, a wireless telephone network, a local area network (LAN), a general wide area network (WAN), and/or a public network (e.g., the Internet). Also connected to the network 60 are user devices 70, 80.

Referring to FIG. 2, each user device 70, 80 may be a general purpose computing device, such as a desktop computer, laptop computer, tablet computer, smartphone, etc. In aspects, the user device 80 is in the form of a smartphone. In embodiments, the user device 70 may be in the form of a smart credit card. In embodiments, each user device 70, 80 includes a mnemonic application module (71, 81), a database (72, 82) and a data input device (73, 83). The data input device may be one or more input devices, such as a keyboard and a camera. In embodiments, the user device 70 may be a computing device separate from a telephone 74. The user device 70 may be in direct communication with the telephone 74 or the user device 70 may be in communication with the telephone 74 through the network 60. By way of example, the user device 70 may be a tablet in wireless communication with a mobile telephone 74 through a wireless network 60. In embodiments, the telephone 74 may not be in communication with the user device 70 at all, such as when a user is on a public pay phone and the user device 70 is a tablet computer. Further, although shown connected to the network 60, it should be understood that the user device 70 does not need to be connected to the network at all, in accordance with embodiments of the invention (e.g., such as when a network connection is not available to a user'). Further, in embodiments, a user device may include a text and or voice recognition module, shown as 85 in the user device 80.

Still referring to FIG. 2, the mnemonic application module 51 of the agent server 50 is configured to perform one or more of the functions described herein. The mnemonic application module 51 may include one or more program modules (e.g., program module 42 of FIG. 1) executed by the agent server 50. In embodiments, the mnemonic application module 51 is configured to decode a mnemonic received from a user. As used herein, the term mnemonic means a sequence of words that represents an encoding of sensitive data, such as a credit card number, a CCV number, a social security number, a password, etc. The mnemonic application module 51 may utilize mnemonic conversion algorithms to decode the mnemonic, as will be discussed in more detail below.

The encryption key generator 52 of the agent server 50 is configured to perform one or more functions described herein. The encryption key generator 52 may include one or more program modules (e.g., program module 42 of FIG. 1) executed by the agent server 50. In embodiments, the encryption key generator 52 is configured to generate an encryption key to be communicated to a user, such as through a telephone connection. In aspects, the encryption key is a short encryption key, such as a two character key.

Still referring to FIG. 2, the mnemonic application modules 71 and 81 of respective user devices 70 and 80 are configured to perform one or more functions described herein. The mnemonic application modules 71 and 81 may each include one or more program modules (e.g., program module 42 of FIG. 1) executed by the respective user devices 70, 80. In embodiments, the mnemonic application modules 71 and 81 are configured to generate a mnemonic of the secure data, as will be discussed in more detail below. The secure data, along with the mnemonic, may be stored in databases 72, 83 of the respective user devices 70, 80.

The text/voice recognition module 85 shown in FIG. 2 may be configured to perform one or more functions described herein. The text/voice recognition module 85 may include one or more program modules (e.g., program module 42 of FIG. 1) executed by the user device 80. In embodiments, the text/voice recognition module 85 is configured to recognize audio communications of encryption keys and convert the audio communications into text for storage in the user device 80. In embodiments, the text/voice recognition module 85 is configured to recognize text based information and transform the text based information into an audio communication of the information. Aspects of the text/voice recognition module 85 will be discussed in more detail below.

Figure 3:
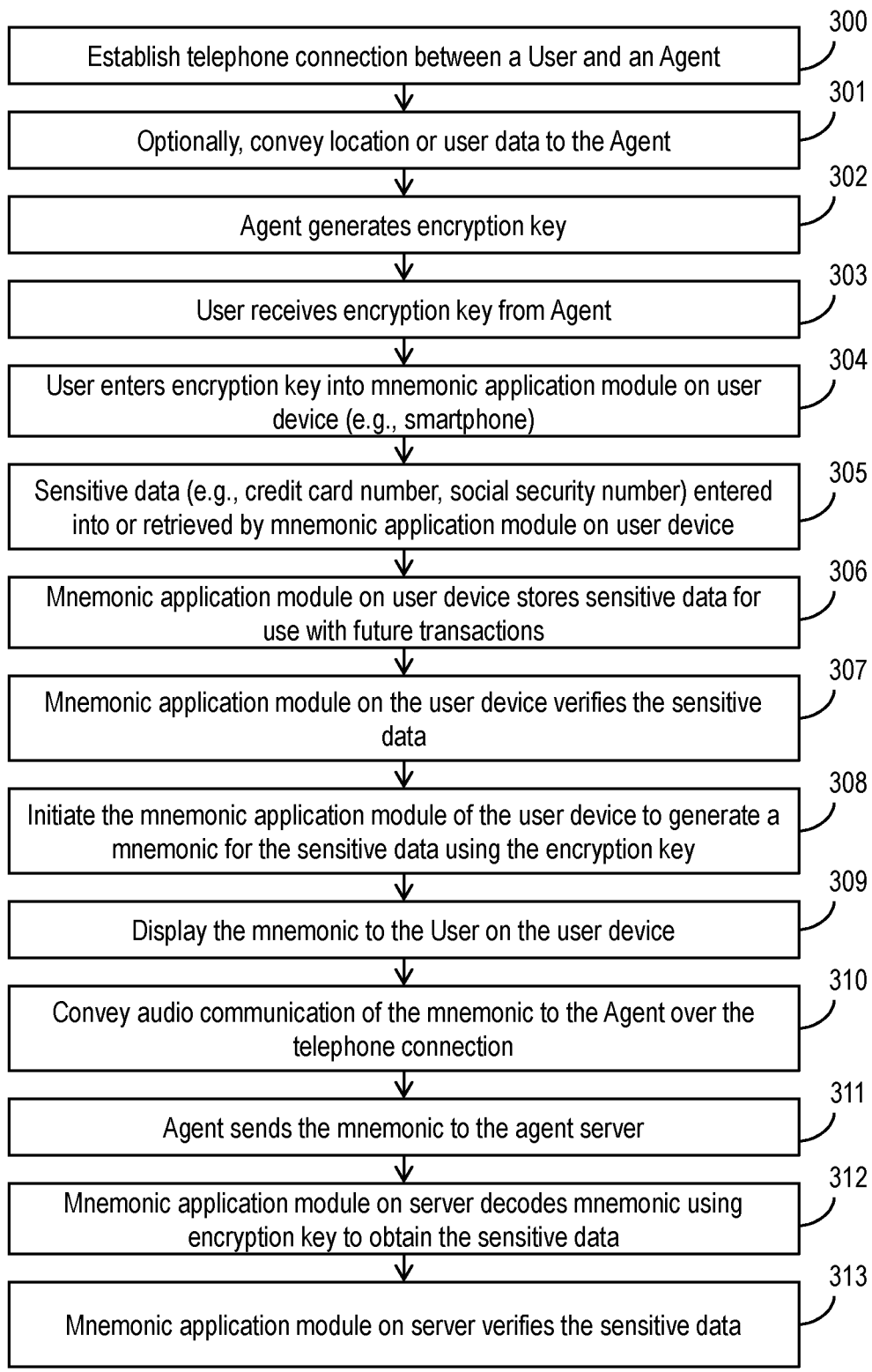
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300 a telephone connection is established between a user (using user device 80 or telephone 74) and an agent (using telephone 53). The telephone connection may be any type of conventional telephone connection.

Optionally, at step 301, user/device data or location data is sent to the agent. By way of example, global positioning system (GPS) location data from a user device 80 may be communicated to the agent server 50 by the user device 80. By way of another example, the user may verbally communicate location information to the agent. In aspects, the user device may convey user information, such as the language utilized by the user, to the agent.

At step 302, an encryption key is generated by an agent server 50. In aspects, the encryption key is generated by the encryption key generator 52 of the agent server 50. In embodiments, the encryption key is a short encryption key, such as a two character key. In aspects, the encryption key is selected based at least in part on user location data or user data. By way of example, if the user is an English speaker, the agent may utilize an encryption key associated with an indexed table of words in English in order to generate an English language mnemonic.

At step 303, the user receives the encryption key from the agent. This may occur in a number of ways. In embodiments, the encryption key is communicated directly from the agent server 50 to a user device (e.g., 70, 80) through the network 60. Such a communication may be in the form of a text message or email message, for example. In embodiments, the agent communicates the encryption key to the user verbally through the telephone connection.

At step 304, the user enters the encryption key into a mnemonic application module (71, 81) of the user device (70, 80). The user may enter the encryption key using the data input device (73, 83). The data input device (73, 83) may be a keypad, for example. Alternatively, in the case where an encryption key is sent directly to a user device (70, 80) through network 60, the mnemonic application module (71, 81) may obtain the encryption key directly from the encryption key communication. By way of example, the mnemonic application module 81 may recognize and import an encryption key received via text message from the agent server 50.

At step 305, the user enters sensitive data into the mnemonic application module (71, 81) using a data input device (73, 83) of the user device (70, 80). By way of example, a user can input the sensitive data via a keyboard, or via a camera of a user device (70, 80). In aspects, a camera is utilized to take a digital photograph of sensitive data, such as a credit card number, and the text/voice recognition module 85 is initiated to process the digital photograph and convert the digital representation of the sensitive data into text based data. Optical character recognition (OCR) techniques may be utilized by the text/voice recognition module 85. Alternatively, if sensitive data has already been stored in the user device (70, 80), such as during a previous mnemonic communicating event, the user may issue instructions to cause the mnemonic application module (71, 81) to receive or retrieve the sensitive data from a database (e.g., 72, 82) of the user device (70, 80).

Optionally, at step 306, the mnemonic application module (71, 81) stores the sensitive data (e.g., in database 72, 82). In aspects the sensitive data remains stored on the user device (70, 80) for use in future sensitive data communications.

Optionally, at step 307, the mnemonic application module (71, 81) verifies the sensitive data. By way of example, credit card number verification algorithms may be utilized to determine whether an entire credit card number has been received by the mnemonic application module (71, 81). In aspects, a check bit is utilized to determine whether an error has occurred in the transmission or storage of the secure data.

At step 308, the mnemonic application module is initiated by the user to generate a mnemonic for the sensitive data utilizing the encryption key. Mnemonic encoding algorithms may be utilized to produce a mnemonic in accordance with the present invention. By way of example, the mnemonic application module (71, 81) may include a table of words. The table of words may be indexed based on the encryption key. To encode a sensitive numeric sequence, such as a credit card number, the mnemonic application module (71, 81) calculates an integer quotient of the sequence divided by a count of the words in the table and calculates a remainder of the number divided by the count of the words in the table. The mnemonic application module (71, 81) selects the word in the table that is indexed by the remainder, and adds that word to the mnemonic. The mnemonic application module (71, 81) then calculates a new remainder of the integer quotient divided by the count of the words in the table and calculates a new integer quotient of the integer quotient divided by the count of the words in the table. This is repeated until the sequence of words in the mnemonic represents the encoding of the sensitive number sequence. In the case where the sensitive data is alphabetic, each letter of the alphabetic data can be first assigned a number, and the resulting number sequence may be utilized in the calculations described above. One of ordinary skill in the art would understand that numerous mnemonic generating techniques could be utilized in conjunction with the present invention, and the present invention is not intended to be limited to the example provided herein.

Still referencing FIG. 3, at step 309, the mnemonic generated at step 308 is displayed to the user through a display (e.g., smartphone display, monitor) of the user device (70, 80).

At step 310, the user communicates the mnemonic to the agent audibly over the telephone connection. By way of example, the user may verbally communicate the mnemonic to the agent through a telephone connection between the user telephone 74 and the agent telephone 53. Advantageously, any bystander witnessing the user's telephone communication would have no basis for decoding the mnemonic to obtain the original secure data. In embodiments, the text/voice recognition module 85 of the user device 80 may be utilized to recognize a text-based mnemonic generated by the mnemonic application module 81 and convert the text-based mnemonic into a synthetic voice output of the mnemonic to the agent. With this embodiment, any bystander witnessing to the user's telephone communication would be unlikely to hear the mnemonic, and would likewise have no basis for decoding the mnemonic to obtain the original secure data.

In step 311, the agent sends the mnemonic to the agent server 50. In aspects, the agent directly enters (via a keyboard or other input device) the mnemonic into the mnemonic application module 51 of the agent server 50. In aspects, the agent communicates the mnemonic to a third party agent, who then enters (via a keyboard or other input device) the mnemonic into the mnemonic application module 51 of the agent server 50. By way of example, a telephone agent using telephone 53 may communicate directly with a user through a user device 80, and may convey the mnemonic received from the user to a credit card processing provider managing the agent server 50.

In step 312, the mnemonic application module 51 of the agent server 50 decodes the mnemonic using the encryption key to obtain the secure data (e.g., credit card number). As noted previously, conventional mnemonic encoding systems may be utilized in this step of the present invention. By way of example, the mnemonic application module 51 of the agent server 50 may contain the same table of words as the mnemonic application module (71, 81) of the user's device (70, 80). By utilizing the encryption key (which is known to the agent) to index the table of words, the agent can decode the mnemonic utilizing the indexed table.

Optionally, at step 313, the mnemonic application module 51 on the agent server 50 may verify the sensitive data obtained at step 312. Verification algorithms can be utilized for this step. By way of example, a check bit may be utilized to determine whether an error has occurred in the transmission or storage of the secure data.

An exemplary use scenario will now be described with reference to FIG. 2. In this scenario, a user of a user device 80 (e.g., smartphone) is in a public location when the user finds it necessary to pay for a product or service over a telephone connection using a credit card number. The telephone agent receives user data from the user device 80 indicating that the user speaks English, and the agent server 50 generates an encryption key "pink bravo" (e.g., steps 301 and 302 of FIG. 3). The agent then verbally communicates the encryption key "pink bravo" over the agent's telephone 53 to the user via the user device 80 (e.g., step 303 of FIG. 3). The user hears the encryption key "pink bravo", opens the mnemonic application module 81, and enters the key into the mnemonic application module 81 through a data input device 83 (e.g., keypad) of the user device 80 (e.g., steps 303 and 304 of FIG. 3). The user then enters a credit card number "0123 4567 8901 2345" into the mnemonic application module 81 through a touchscreen or keyboard of the user device 80 (e.g., step 305 of FIG. 3), and initiates the encoding function of the mnemonic application module 81 to generate a mnemonic representation of the credit card number "Blue Fox Sierra Mars Nevada" using the encryption key "pink bravo", and display the mnemonic to the user through a display (e.g., 24) of the user device 80 (e.g., steps 308 and 309 of FIG. 3). The user then verbally communicates the mnemonic "Blue Fox Sierra Mars Nevada" to the agent over the telephone connection (e.g., step 310 of FIG. 3). The agent inputs the mnemonic "Blue Fox Sierra Mars Nevada" into the mnemonic application module 51 of the agent server 50 (e.g., step 311 of FIG. 3), and initiates a decoding process to transform the mnemonic back into the credit card number "0123 4567 8901 2345" using the encryption key "pink bravo" (e.g., step 312 of FIG. 3). The agent server 50 then runs a verification procedure to check for errors in the communication of the credit card number (e.g., step 313 of FIG. 3). Once verified, the credit card number is processed by the agent.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that requires the use of user's sensitive data, such as credit card processing entities. In return, the service provider can receive payment from the customer(s) under a subscription and/or fee agreement and/or the service provider can receive payment from the sale of advertising content to one or more third parties.

In still another embodiment, the invention provides a computer-implemented method for utilizing a mnemonic to communicate sensitive data to an agent. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   establishing, by a computing device of a caller, a telephone connection between the caller and a telephone of an agent;
   sending, by the computing device of the caller, location data of the caller to the agent;
   receiving, by the computing device of the caller, an encryption key from the agent, wherein the encryption key corresponds to the location data of the caller;
   entering, by the computing device of the caller, the encryption key received from the agent into a mnemonic application of the computer device of the caller;
   identifying, by the computing device of the caller, an indexed table of words based on the encryption key, wherein the indexed table of words corresponds to the location data of the caller to the agent;
   permuting, by the computing device of the caller, an algorithm of the mnemonic application using the encryption key, thereby configuring the algorithm to encode sensitive data based on the encryption key;
   receiving, by the computing device of the caller, the sensitive data in the form of an alphabetic sequence;
   generating, by the algorithm of the mnemonic application of the computing device of the caller and based on the indexed table of words, a mnemonic of the sensitive data, wherein the mnemonic is a sequence of words representing the sensitive data;
   displaying, by the computing device of the caller, the mnemonic to the caller; and
   conveying, by the computing device of the caller, an audio communication of the mnemonic to the agent through the telephone connection to enable remote decoding of the mnemonic back into the sensitive data utilizing the encryption key.

2. The method of claim 1, further comprising:
   entering, by the computing device of the caller, the sensitive data into the computing device of the caller; and storing, by the computing device of the caller, the sensitive data in a database of the computing device of the caller.

3. The method of claim 2, wherein entering the sensitive data into the mnemonic application of the computing device of the caller comprises:
   initiating, by the computing device of the caller, a camera to take a digital picture of the sensitive data; and
   initiating, by the computing device of the caller, a character recognition function to determine the sensitive data from the digital picture.

4. The method of claim 1, wherein the sensitive data is a credit card number.

5. The method of claim 1, further comprising receiving, by the computing device of the caller, an audio communication of the encryption key over the telephone connection.

6. The method of claim 1, further comprising:
   implementing, by the computing device of the caller, voice recognition software to determine the encryption key received via the audio communication; and
   storing, by the computing device of the caller, the encryption key in a database of the computing device of the caller.

7. The method of claim 1, wherein the location data is global positioning system data from the computing device of the caller.

8. A computer program product comprising a computer readable storage medium having program instructions embodied therewith, the program instructions executable by a computing device to cause the computing device to:
   establish a telephone connection between the computing device and a telephone of a remote agent, wherein the computing device is a computing device of a caller;
   send location data of the caller to the agent;
   receive an encryption key from the remote agent, wherein the encryption key is selected based on the location data of the caller;
   enter the encryption key into a mnemonic application of the computing device;
   identify an indexed table of words based on the encryption key, wherein the indexed table of words corresponds to the location data of the caller to the agent;
   permute an algorithm of the mnemonic application using the encryption key, thereby configuring the algorithm to encode sensitive data based on the encryption key;
   enter the sensitive data in the form of an alphabetic sequence into the mnemonic application of the computing device;
   generate, by the algorithm of the mnemonic application and based on the indexed table of words, a mnemonic of the sensitive data, wherein the mnemonic is a sequence of words representing the sensitive data;
   display the mnemonic to the caller; and
   convey audio communication of the mnemonic to the remote agent through the telephone connection to enable remote decoding of the mnemonic back into the alphabetic sequence utilizing the encryption key.

9. The computer program product of claim 8, further comprising program instructions executable by a computing device to cause the computing device to store the sensitive data in a database of the computer device.

10. The computer program product of claim 8, further comprising program instructions executable by a computing device to cause the computing device to receive an audio communication of the encryption key over the telephone connection.

11. The computer program product of claim 8, further comprising program instructions executable by a computing device to cause the computing device to:
   implement voice recognition software to determine the encryption key received via the audio communication; and
   store the encryption key in a database of the computing device.

12. The computer program product of claim 8, further comprising program instructions executable by a computing device to cause the computing device to:
   initiate a camera to take a digital picture of the sensitive data;
   initiate a character recognition function to determine the sensitive data from the digital picture; and
   store the sensitive data in a database of the computing device.

13. The computer program product of claim 8, wherein the location data of the caller is in the form of global positioning system (GPS) data of the computing device, wherein the mnemonic is derived, at least in part, based on the GPS data.

14. A computing device of a caller comprising:
   a CPU; a computer readable memory; and a computer readable storage medium comprising program instructions which are executable by the CPU to:
      establish a telephone connection between the computing device and a telephone of a remote agent;
      send location data of the computing device to the agent;
      receive an encryption key from the remote agent, wherein the encryption key corresponds to the location data of the computing device;
      enter the encryption key into a mnemonic application of the computing device;
      identify an indexed table of words based on the encryption key, wherein the indexed table of words corresponds to the location data of the caller to the agent;
      permute an algorithm of the mnemonic application using the encryption key, thereby configuring the algorithm to encode sensitive data based on the encryption key;
      enter the sensitive data into the mnemonic application of the computing device, the sensitive data comprising an alphabetic sequence;
      generate, by the algorithm of the mnemonic application and based on the indexed table of words, a mnemonic of the sensitive data, wherein the mnemonic is a sequence of words representing the sensitive data;
      display the mnemonic to the caller; and
      convey audio communication of the mnemonic to the remote agent through the telephone connection to enable remote decoding of the mnemonic back into the sensitive data utilizing the encryption key.

15. The computing device of claim 14, wherein the program instructions are further executable to: store the sensitive data in a database of the computer device, wherein the sensitive data is selected from the group consisting of a social security number, a password, a birth date, a security question answer, a credit card, a card verification value, a credit card expiration date, and combinations thereof.

16. The computing device of claim 14, wherein the program instructions are further executable to: receive an audio communication of the encryption key over the telephone connection.

17. The computing device of claim 14, wherein the program instructions are further executable to:

implement voice recognition software to determine the encryption key received via the audio communication; and store the encryption key in a database of the computing device.

18. The computing device of claim 14, wherein the program instructions are further executable to:

initiate a camera to take a digital picture of the sensitive data;

initiate a character recognition function to determine the sensitive data from the digital picture; and store the sensitive data in a database of the computing device.

19. The computing device of claim 14, wherein the location data of the computing device comprises global positioning system data of the computing device.

\* \* \* \* \*